United States Patent
Son et al.

(10) Patent No.: US 7,170,534 B2
(45) Date of Patent: Jan. 30, 2007

(54) AUTOMATIC CONTROLLABLE DISPLAY DEVICE ACCORDING TO IMAGE DISPLAY DIRECTION

(75) Inventors: Il Kwon Son, Daegu-si (KR); Bong Chun Shim, Gumi-si (KR)

(73) Assignee: Sevit Co., Ltd. (KR)

( * ) Notice: Subject to any disclaimer, the term of this patent is extended or adjusted under 35 U.S.C. 154(b) by 335 days.

(21) Appl. No.: 10/480,638

(22) PCT Filed: Jun. 27, 2002

(86) PCT No.: PCT/KR02/01224

§ 371 (c)(1),
(2), (4) Date: Dec. 23, 2003

(87) PCT Pub. No.: WO03/003729

PCT Pub. Date: Jan. 9, 2003

(65) Prior Publication Data
US 2004/0164974 A1    Aug. 26, 2004

(30) Foreign Application Priority Data
Jun. 27, 2001  (KR) ........................ 10-2001-37074
Jun. 27, 2001  (KR) ........................ 10-2001-37076

(51) Int. Cl.
G09G 5/00    (2006.01)
(52) U.S. Cl. ...................... 345/659; 361/681

(58) Field of Classification Search ............... 345/204, 345/659, 649; 315/169.1–169.4; 349/1; 361/681
See application file for complete search history.

(56) References Cited

U.S. PATENT DOCUMENTS
6,788,292 B1 *  9/2004  Nako et al. ................ 345/173

FOREIGN PATENT DOCUMENTS
EP          516475 A1      12/1992
JP          08287291 A  *  11/1996
WO          WO 98/26585     6/1998

* cited by examiner

Primary Examiner—Amr A. Awad
Assistant Examiner—Stephen G Sherman
(74) Attorney, Agent, or Firm—Edell, Shapiro & Finnan, LLC

(57) ABSTRACT

Automatic controllable display device according to image display direction comprising: image display matter which image displayed in; slope information controller for detecting slope information of the image display matter; main controller for generating image controlling signal as a slope of the image display matter and receiving the slope information of image display matter which is detected by the image information controller; image display controller which handle image signal for displaying in the image display matter by image controlling signal; image display memory for storing the image signal, and furnishing the image display matter the image signal.

7 Claims, 9 Drawing Sheets

| No | Location data | | Scanning direction | Start point | | End point | |
|---|---|---|---|---|---|---|---|
| | X | Y | | Horizontal | Vertical | Horizontal | Vertical |
| 1 | 0 | 0 | Forward direction | 0 | 0 | 100 | 100 |
| 2 | 180 | 0 | Forward direction | 100 | 100 | 0 | 0 |
| 3 | 180 | 0 | Reverse direction | 0 | 0 | 100 | 100 |
| ⋮ | ⋮ | ⋮ | ⋮ | ⋮ | ⋮ | ⋮ | ⋮ |

(A)

(B)

(C)

(D)

AUTOMATIC CONTROLLABLE DISPLAY DEVICE ACCORDING TO IMAGE DISPLAY DIRECTION

TECHNICAL FIELD

The present invention relates to a display device, and more particularly, to a display device capable of automatically controlling the display direction of an image, in which the displayed image is viewed in a normal direction when the display device is varied in slope (rotational angle of the image display unit) and even when the display device is turned upside down, and an operation method thereof.

BACKGROUND ART

For the past a few years, there have been introduced various kinds of display devices in the aspect of shapes and functions, etc., and various portable display devices are also being developed. However, in case of a portable display device, the image displayed on its display unit may look tilted according to the installation direction of the portable display device. To comply with a request to solve the disadvantage, there is introduced a display product, in which a user can select and change the display direction of the image displayed on its display unit manually as shown in FIG. 1 to compensate for a rotation angle of the image as much as the image display unit is tilted.

FIG. 1 is a block diagram schematically showing the structure of a conventional display device.

With reference to FIG. 1, a conventional display device includes a user input unit 110 for receiving a control instruction input by a user, a control unit 120 for processing a control signal transmitted from the user input unit 110, an image display control unit 130 for processing an image signal (brightness, resolution, display size, etc.) to be displayed on a display screen according to a signal transmitted from the control unit 120, an image display unit 150 for displaying a signal transmitted from the image display control unit 130, and an image display memory 140 for storing information to be displayed on the image display unit 150.

The control unit 120 includes a microcomputer 121 for generally controlling the whole operation of the device, an input/output control unit 123 for processing a communication between the microcomputer 121 and the image display control unit 130, and a control unit memory 122 for storing a particular form of information which is necessary in the control unit 120.

Next, there will be illustrated a method of processing the display image according to the control instructions from a user in the display device structured as above.

If a user wants to compensate for the tilted angle of the image displayed on the image display unit 150 as much as the display device is tilted, a control instruction to change the image display direction should be inputted through the user input unit 110.

Accordingly, the control instruction input to the user input unit 110 by a user is transmitted to the control unit 120, and the input/output control unit 123 of the control unit 120 transmits the control signal of the compensated information in the form of a data signal (DATA), a clock signal (CLK), and an enable signal (EN) to the image display control unit 130.

The DATA, CLK and EN to be used are communication protocols to control the image display control unit 130.

In more detail, the enable signal (EN) is output in a high state (HIGH) when communicating with the image display control unit 130. As such, the image display control unit 130 can accept the signal even if the enable signal (EN) in a high state (HIGH) sends the DATA and CLK signals.

Then, after the communication is completed, the EN is converted into a low state (LOW) again, and the transmission of the control signal is completed.

Here, the DATA consists of the values of address and registers which the image display control unit 130 should actually control, and the CLK is used for synchronization when the data output is executed.

The image display control unit 130, which receives the control signal transmitted from the control unit 120, calculates the compensation of the image information input through the user input unit 110 by a user, and converts and stores the information for the display into the image display memory 140. Then, the data stored in the image display memory 140 is displayed through the image display unit 150.

In view of the above to take an example, in case that a user wants to see the image on the display screen in an opposite direction with the display device turned upside down, he or she should select the function mode to change the image display direction by using the user input unit 110 such as a remote controller or a panel of the display device, and choose an 'inversion' mode for the image display direction. Then, the control unit 120 extracts the register values related with the inversion of the display screen of the image display control unit 130 to make the image display direction inverse.

The data of the extracted values is transmitted from the control unit 120 through DATA, CLK and EN to the each of the registers of the image display control unit 130. Accordingly, the image display control unit 130 stores the image signal input according to the change of the register values into the image display memory 140 by changing as a digital value.

Then, since the stored values are stored in a manner that the start portion of the displayed image is stored from the end portion of the image display memory 140, the image is not displayed inversely even if the image display unit 150 is turned upside down, and accordingly, when a user sees the image through the image display unit 150, the image is displayed in a normal direction without inversion.

FIG. 2(a) illustrates a state that the image is displayed when the conventional image display unit is placed in a normal direction, and FIG. 2(b) illustrates a state that the image is displayed when the conventional image display unit is placed inversely.

In addition, the direction of the arrows on the drawings indicates the upper side of the image display unit 150.

As described above, the state that the upside and the downside of the image display unit 150 of the display device are exchanged, that is, the state that the image display unit 150 is placed inversely, a user should reset the image display direction by means of the user input unit 110, and select the image display direction for the image display unit 150.

As shown in FIG. 2, even though the upside and the downside of the image display unit 150 are actually exchanged, the up and the down locations of the image displayed on the image display unit 150 are not exchanged to show the image in a normal direction.

However, in case that a user should reset the image display direction according to the installation state of the image display unit 150, there exists an inconvenience that the user should readjust the image display direction every time the installation state of the image display unit 150 is changed.

In addition, in case that the tilted degree of the image display unit 150 is not exactly caught, there exists a disadvantage of taking many times of trials and errors until the image is displayed on the display screen in a normal direction.

Accordingly, the present invention has been devised to obviate the aforementioned drawbacks.

An object of the present invention is to provide a display device capable of automatically controlling the image display direction in which when slope of the display device is changed, the image display direction is automatically reset to be matched with the changed slope, e.g., the rotational angle of the display device, thereby enabling more convenient use of the display device.

In particular, even if the display device is turned upside down, the image displayed on the display device is normally displayed without being turned upside down.

DISCLOSURE OF THE INVENTION

To achieve these and other advantages and in accordance with the purpose of the present invention, as embodied and broadly described, a display device capable of automatically controlling an image display direction may include an image display unit for displaying an image, a slope information processing unit for detecting slope information of the image display unit, a control unit for receiving the slope information of the image display unit detected by the slope information processing unit, and producing an image control signal according to the tilted state of the image display unit, an image display control unit for receiving the image control signal produced by the control unit, and processing the image signal to be displayed on the image display unit, and an image display memory for storing the image signal processed in the image display control unit, and supplying the stored image signal to the image display unit.

According to another aspect of the present invention, a display device capable of automatically controlling an image display direction may include an image display unit having a gyro-sensor auxiliarily installed and an image display panel placed on an upper side thereof to display an image, a circuit installation unit placed on a lower side of the image display unit with hinge-coupled at a corner of the image display unit, and including components to control the image display direction by the slope of the image display unit detected by the gyro-sensor, a fixing unit installed on a lower side of the circuit installation unit to make the display device possibly fixed on the wall or the ceiling, and a portrait hinge vertically inserted into the circuit installation unit and the fixing unit to make the circuit installation unit possibly rotate.

In another aspect of the present invention, there is provided an operation method of a display device capable of automatically controlling an image display direction. The operational method includes the steps of: acquiring a slope information of an image display unit; extracting an image display control data fit for a tilted state acquired by the image display unit; storing an image data in a memory according to the extracted image display control data; and outputting the image data stored in the memory on the image display unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

Figure 1:
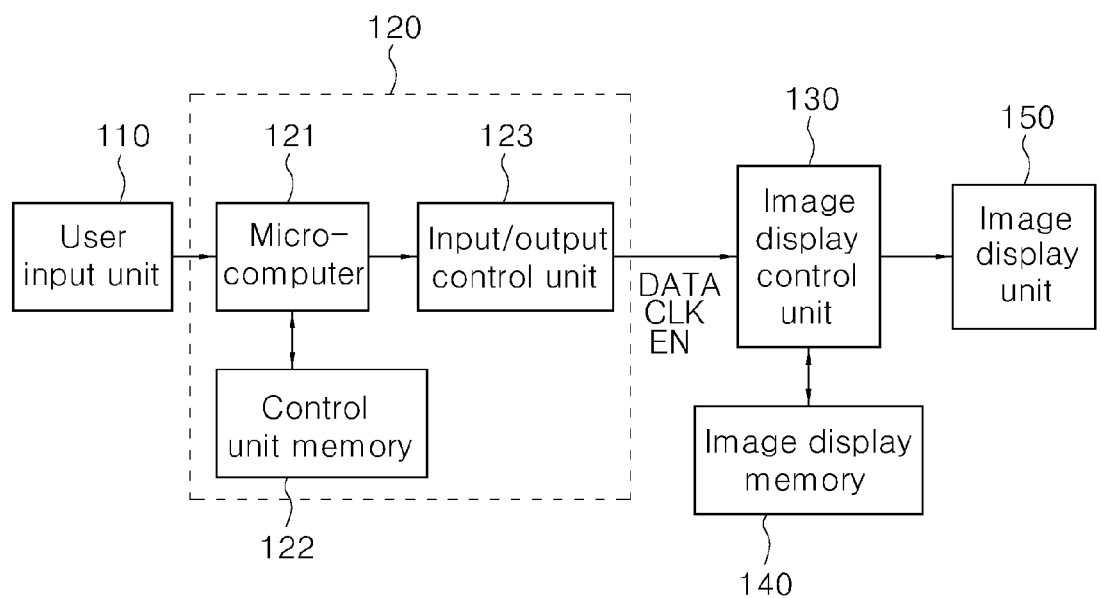
FIG. 1 is a block diagram schematically showing the structure of a conventional display device.
Figure 2:
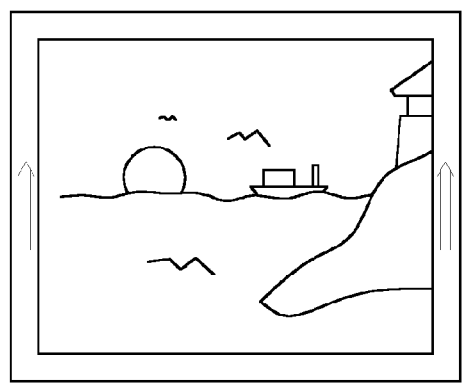
FIG. 2 illustrates the comparison of the states that images are displayed on the conventional image display unit which is normally placed and turned upside down according to the image display direction setting respectively.
Figure 2:
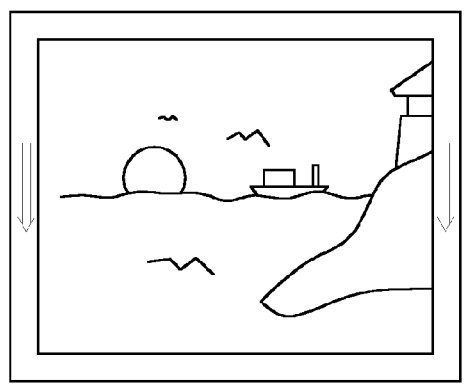
Figure 3:
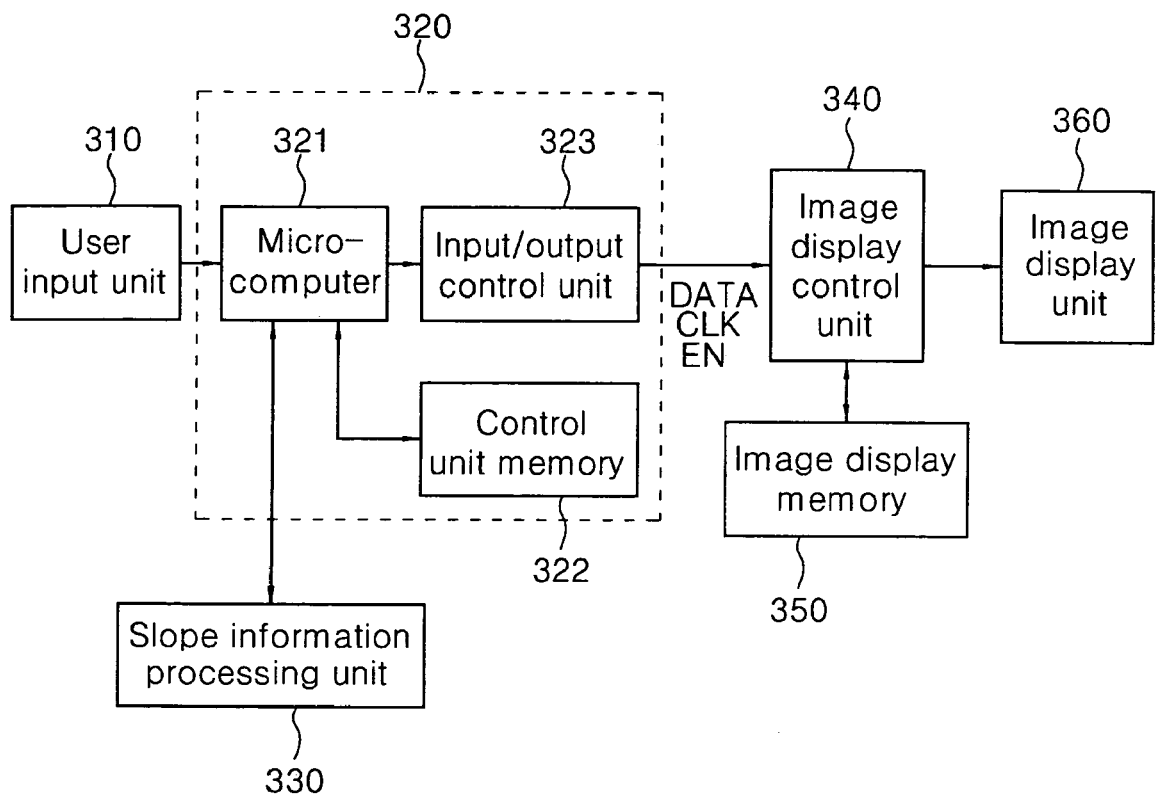
FIG. 3 is a block diagram schematically showing the structure of the display device capable of automatically controlling the image display direction according to the present invention.

FIG. 3 is a block diagram schematically showing the structure of the display device capable of automatically controlling the image display direction according to the present invention.

Referring to FIG. 3, a display device capable of automatically controlling the image display direction of the present invention includes a user input unit 310 into which a control instruction is inputted by a user, an image display unit 360 on which image is displayed, a slope information processing unit 330 for detecting the slope information of the image display unit 360, a control unit 320 for receiving the slope information of the image display unit 360 detected by the slope information processing unit 300 and producing the image control signal according to the tilted state of the image display unit 360, an image display control unit 340 for receiving the transmitted image control signal produced by the control unit 320 and processing the image signal (brightness, resolution, size, etc.) to be displayed on the image display unit 360, and an image display memory 350 for storing the image signal processed in the image display control unit 340, and supplying the stored image signal to the image display unit 360.

In detail, the control unit 320 includes a microcomputer 321 for performing a general control of the device, an input/output control unit 323 for processing the communication between the microcomputer 321 and the image display control unit 340, and a control unit memory 22 for storing a specific format of information which is necessary in the control unit 320.

Now, with reference to FIG. 4, the process of automatically controlling the image display direction in the display device of the present invention having a structure as above according to its slope will be described.

Figure 4:
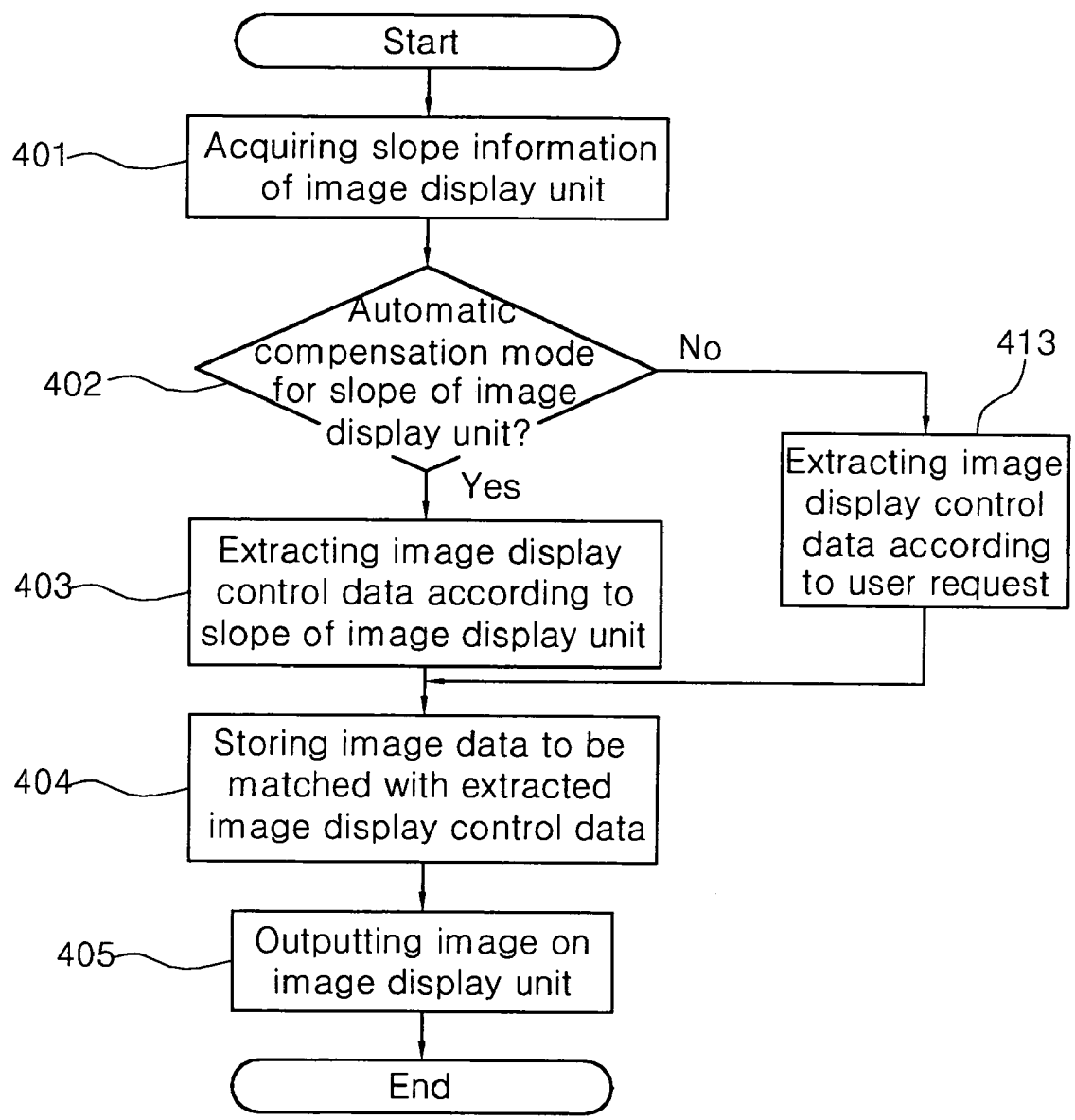
FIG. 4 is a flow chart showing the process of controlling the image display direction according to the tilted angle of the display device capable of automatically controlling the image display direction of the present invention.

FIG. 4 is a flow chart showing the process of controlling the image display direction according to the tilted angle of the display device capable of automatically controlling the image display direction of the present invention.

First, the slope information processing unit 330 of the display device acquires the slope information of the image display unit 360 (step 401). Here, the slope information processing unit 330 can be realized by using various location sensors, and FIG. 5 illustrates one example of the sensors, a gyro-sensor.

Figure 5:
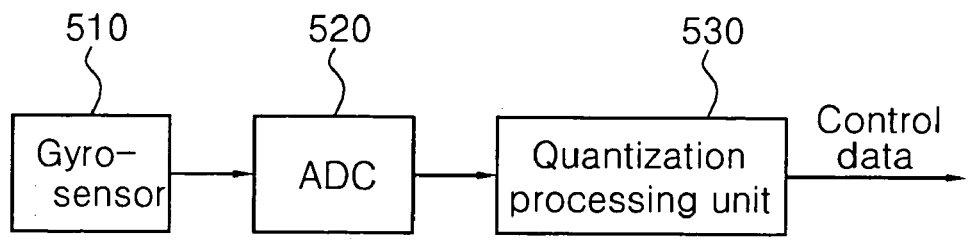
FIG. 5 is a block diagram of the slope information processing unit using a gyro-sensor as one example of a tilt sensor to supply the slope information of the display device capable of automatically controlling the image display direction of the present invention.

FIG. 5 is a block diagram of the slope information processing unit using a gyro-sensor as one example of a tilt sensor to supply the slope information of the display device capable of automatically controlling the image display direction of the present invention.

The gyro-sensor 510 is a device to detect the information for the location or the angle of an object, and can be divided into a normal gyro-sensor to detect the only angle (slope), a three-dimensional gyro-sensor to determine the location or the angle, etc. in the space, and the like.

In the meantime, the location information of the image display unit 360 detected by the gyro-sensor 510 is converted into a digital signal through an analog digital conversion unit (ADC) 520. A quantization processing unit 530 performs a quantization process for the slope information of the image display unit 360 converted into a digital signal by the analog digital conversion unit 520 according to a set period.

Here, the quantization means the process of the allotment of installation values according to the tilted state of the image display unit 360.

For example, in setting a classification value for the installation state of the image display unit 360, the classification value can be set into two states, that is, a normal direction for a vertical direction (rotation angle 0°) and an inverse direction (rotation angle 180°). Accordingly, the process for displaying image on the image display unit 360 according to the set state is performed.

However, the classification of the installation state of the image display unit 360 is not limited to the normal direction and the inverse direction as above, and various classification values for the installation state of the image display unit 360 can be set according to the application purposes of the display device. For example, the quantization interval can have various setting values according to the installation state of the image display unit such as a normal direction (rotation angle 0°), a left rotation direction (rotation angle 90°), an invert direction (rotation angle 180°), a right rotation direction (rotation angle 270I°). In the meantime, when it is necessary to classify the installation states more variously, more setting values can be provided.

Figure 6:
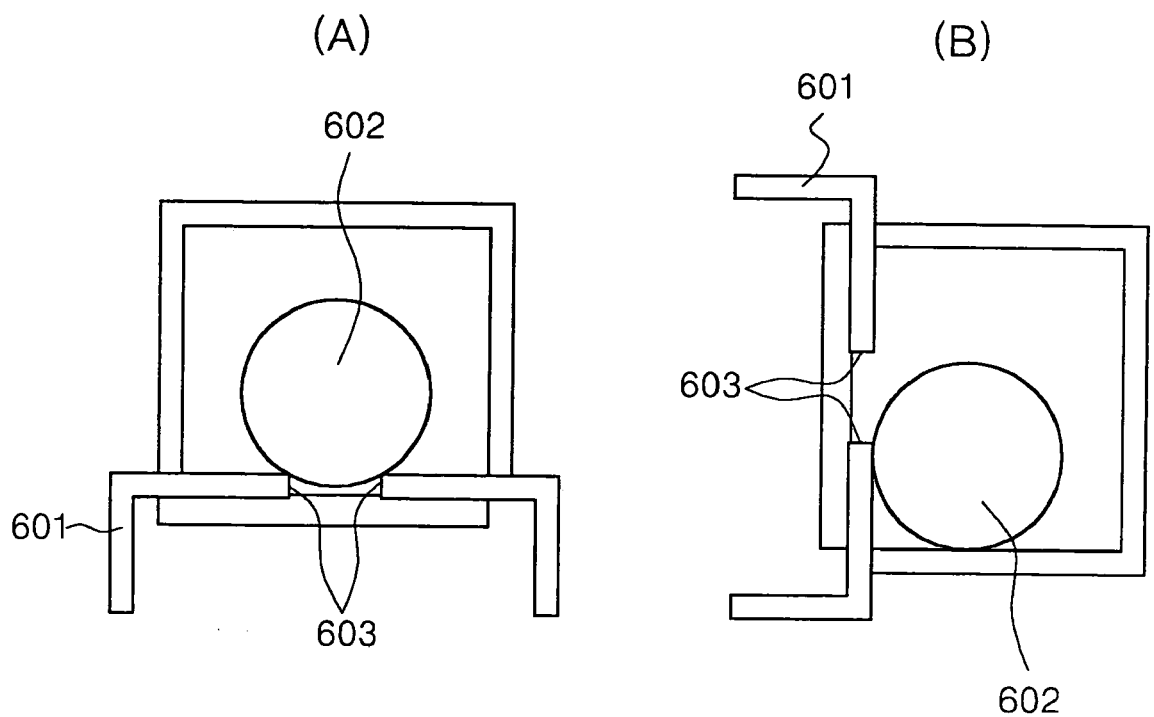
FIG. 6 is a view schematically showing a conduction detection switch as one example of a tilt sensor to supply the slope information of the display device capable of automatically controlling the image display direction of the present invention.
Figure 7:
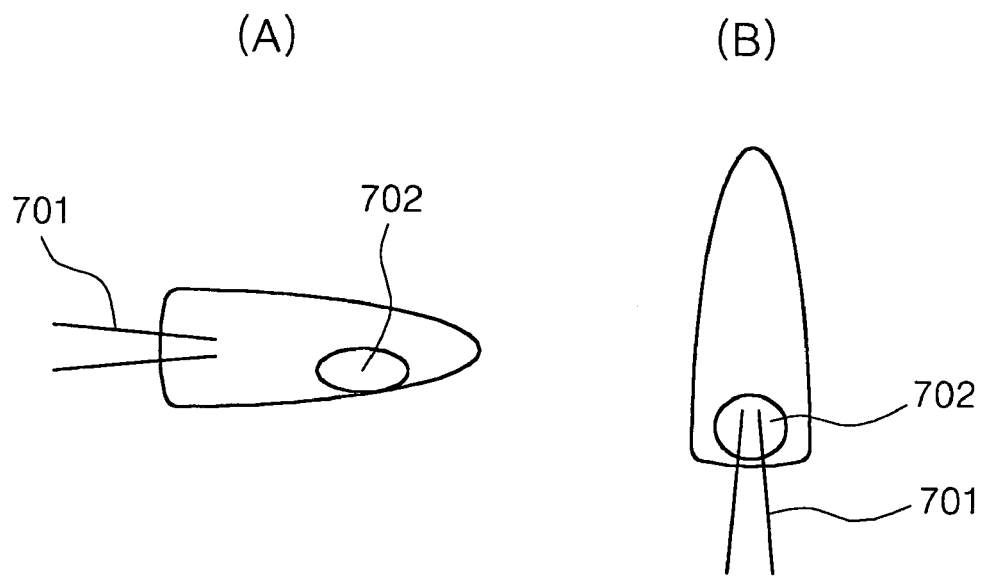
FIG. 7 is a view showing a metal shell switch as one example of a tilt sensor to supply the slope information of the display device capable of automatically controlling the image display direction of the present invention.

FIGS. 6 and 7 show one example of the tilt sensor respectively.

FIG. 6 is a representation schematically showing a conduction detection switch as one example of a tilt sensor to supply the slope information of the display device capable of automatically controlling the image display direction of the present invention, and FIG. 7 is a representation showing a metal shell switch as one example of a tilt sensor to supply the slope information of the display device capable of automatically controlling the image display direction of the present invention.

FIG. 6 shows the conduction detection switch, and the movement of a conduction ball 602 occurs according to the tilted state of an object, that is, the image display unit 360 to which the conduction detection switch is attached. By the movement of the conduction ball 602, the location of the contact point 603 of the conduction ball 602 to contact with a terminal 601 is changed, and accordingly, the flow of the electric current is on/off.

FIG. 6(A) illustrates an on-state of the electric current, and FIG. 6(B) illustrates an off-state of the electric current. As such, since the flow of the electric current is changed according to the slope of the conduction detection switch, the tilted state of the object having the conduction detection switch attached thereon such as the image display unit can be detected.

FIG. 7 illustrates a metal shell switch, and the movement of a movable metal 702 occurs according to the tilted state of the object having the metal shell switch attached thereon such as the image display unit 360. Here, the on/off of an electrode 701 is determined by the movement of the movable metal 702.

That is, in case that the metal shell switch is horizontally placed as shown in FIG. 7(A), the flow of electric current is not generated because the electrode 701 is not connected, and in case that the metal shell switch is vertically placed as shown in FIG. 7(B), the flow of electric current is generated because the electrode 701 is connected by the movable metal 702. Described as above, as the flow of electric current is changed according to the slope of the metal shell switch, the tilted state of the object such as the image display unit on which the metal shell switch is attached can be detected by sensing the slope of the switch.

Figure 8:
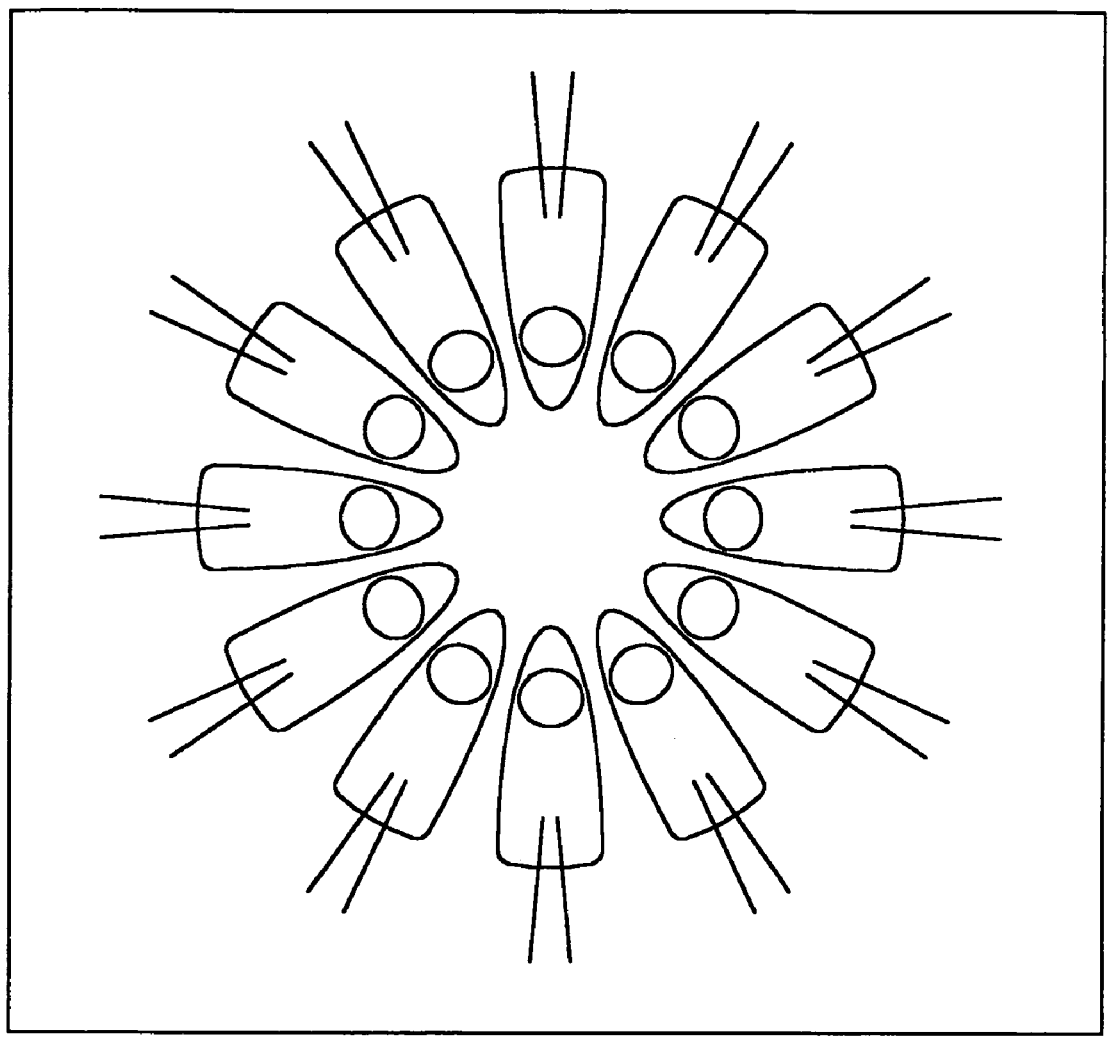
FIG. 8 is a view conceptually showing the method of acquiring the slope information of the display device capable of automatically controlling the image display direction and using a metal shell switch of the present invention.

In the meantime, FIG. 8 is a representation conceptually showing the method of acquiring the slope information of the display device capable of automatically controlling the image display direction and using a metal shell switch of the present invention.

As shown in FIG. 8, if using a plurality of the location detection switches, the resolution for the slope information as high as necessary can be realized. That is, one location detection switch can be attached to each direction of x-axis, y-axis, z-axis, or several location detection switches can be attached on the x-y surface as shown in FIG. 8 so that the slope information of the x-y surface can be detected more precisely. More various kinds of location detection switches can be employed as well as the conduction detection switch and the metal shell switch as described before.

In the meantime, the slope information processing unit 330, which acquired the slope information of the image display unit 360 in the step 401, supplies the acquired slope information of the image display unit 360 to the control unit 320. Then, the control unit 320 determines whether the slope compensation mode of the image display unit 360 is set in the setting of the display device (step 402).

As a result of determination in the step 402, in case that the slope compensation mode of the image display unit 360 is set, the control unit 320 extracts the image display control data according to the slope of the image display unit 360 (step 403).

The image display control data extracted here includes the information for a start point and an end point at which the image is displayed on the image display unit 360 according to the tilted state of the image display unit 360, and a scan direction.

Figure 9:
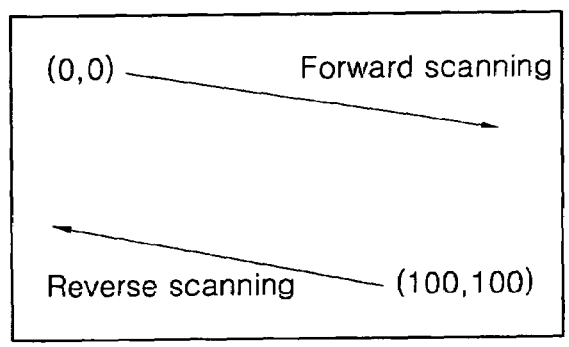
FIG. 9 illustrates examples of the allotment and scanning direction of the memory according to the rotation angle (tilted angle) of the display device capable of automatically controlling the image display direction of the present invention.

FIG. 9 illustrates examples of the allotment and scanning direction according to the rotation angle of the display device of the present invention capable of automatically controlling the image display direction.

Referring to FIG. 9, the first state (No. 1) means that the installation state of the image display unit 360 is a normal direction (rotation angle 0°), the second state (No. 2) and the third state (No. 3) mean that the installation state of the image display unit 360 is an inverse direction (rotation angle 180'). In the first state, the start point is set as (0, 0), and the end point is set as (100, 100), and by making the scanning direction in the forward direction, image is displayed on the image display unit 360.

In case that the image display unit 360 is installed in the inverse direction, the image is not even inversely displayed on the image display unit 360 (the image is not turned upside down), but displayed in a normal direction by the setting of the second state (No. 2), and by the third state of setting, the image can be displayed in a normal direction, too.

That is, if comparing the second state and the third state, the setting of the start point and the end point is opposite, and the scanning direction is set in the forward direction and the inverse direction according thereto to provide the same effects.

The extracted image display control data is transmitted from the control unit 320 to the image display control unit 340. The image display control unit 340 stores the image data to the image display memory 350 according to the extracted image display control data (step 404).

Figure 10:
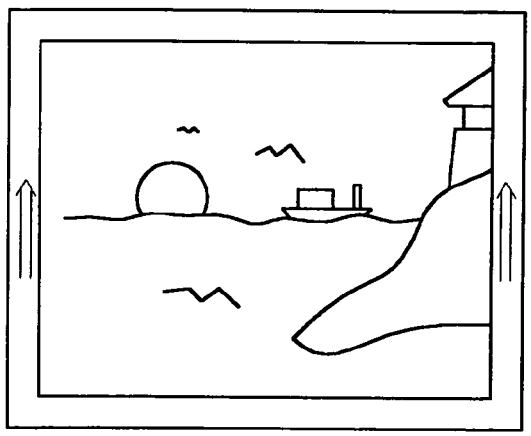
FIG. 10 illustrates the states that images are displayed on the image display unit of the display device capable of automatically controlling the image display direction of the present invention according to its rotation angle.
Figure 10:
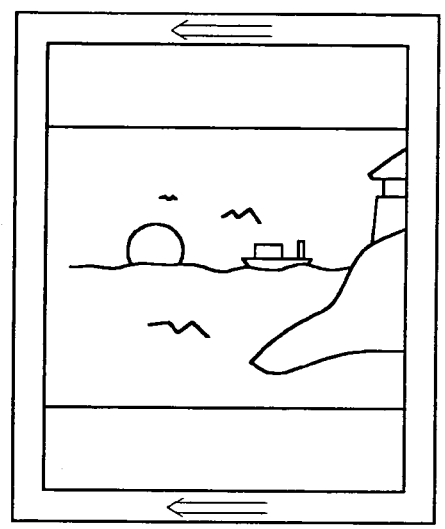
Figure 10:
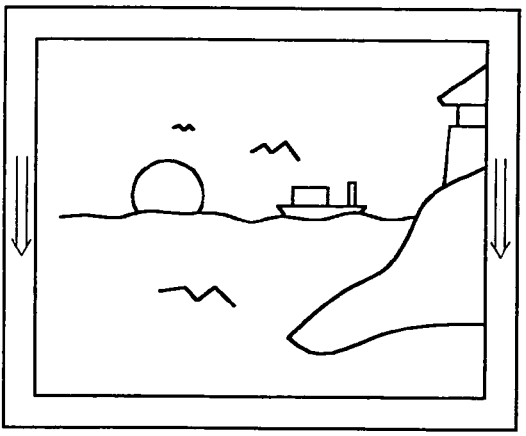
Figure 10:
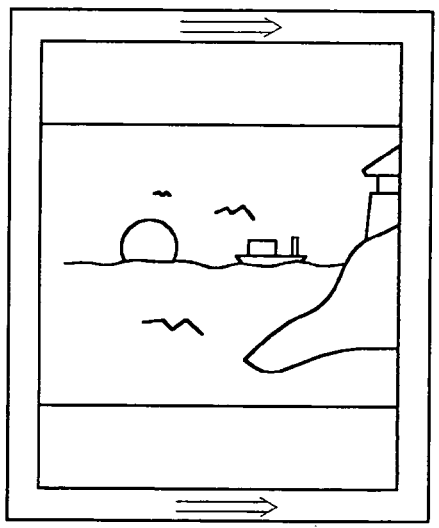

Accordingly, the image data stored in the image display memory 350 is output through the image display unit 360 as shown in FIG. 10 (step 405).

FIG. 10 illustrates the states that images are displayed on the image display unit in the display device capable of automatically controlling the image display direction of the present invention according to its rotation angle.

FIG. 10 illustrates each case where image is displayed according to the installation state of the image display unit, (A) shows the case that the image display unit is installed in the normal direction (rotation angle 0°), (B) shows the installation of the image display unit in left rotation direction (rotation angle 90°), (C) shows the installation of the image display unit in the inverse direction (rotation angle 180°), and (D) shows the installation of the image display unit in the right rotation direction (rotation angle. 270°). That is, the displayed image is output in the normal direction without turned upside down regardless of the installation direction of the image display unit.

According to the installation setting of the display device as shown in FIGS. 10(B) and (D), in case that the ratio of the horizontal/vertical direction of the image display unit 360 is not 1 (one), the dimension of the displayed image is controlled in accordance with the small side of the both sides, and the image after readjusted in its horizontal/vertical dimension is displayed, which can be realized when extracting the image display control data by fitting its start point and end point according to the changed dimension of the display unit.

However, when required by a user, the dimension of the displayed image can be controlled to fit to the large side of the axis, and the changed image can be displayed.

In the meantime, as a result of the determination of the step 402, in case that the compensation mode for the slope of the image display unit 360 is not set (passive mode), image display control data corresponding to the user request is extracted (step 413), and the process following the step 404 is performed. Accordingly, the image data stored in the image display memory 350 is output through the image display unit 360.

Figure 11:
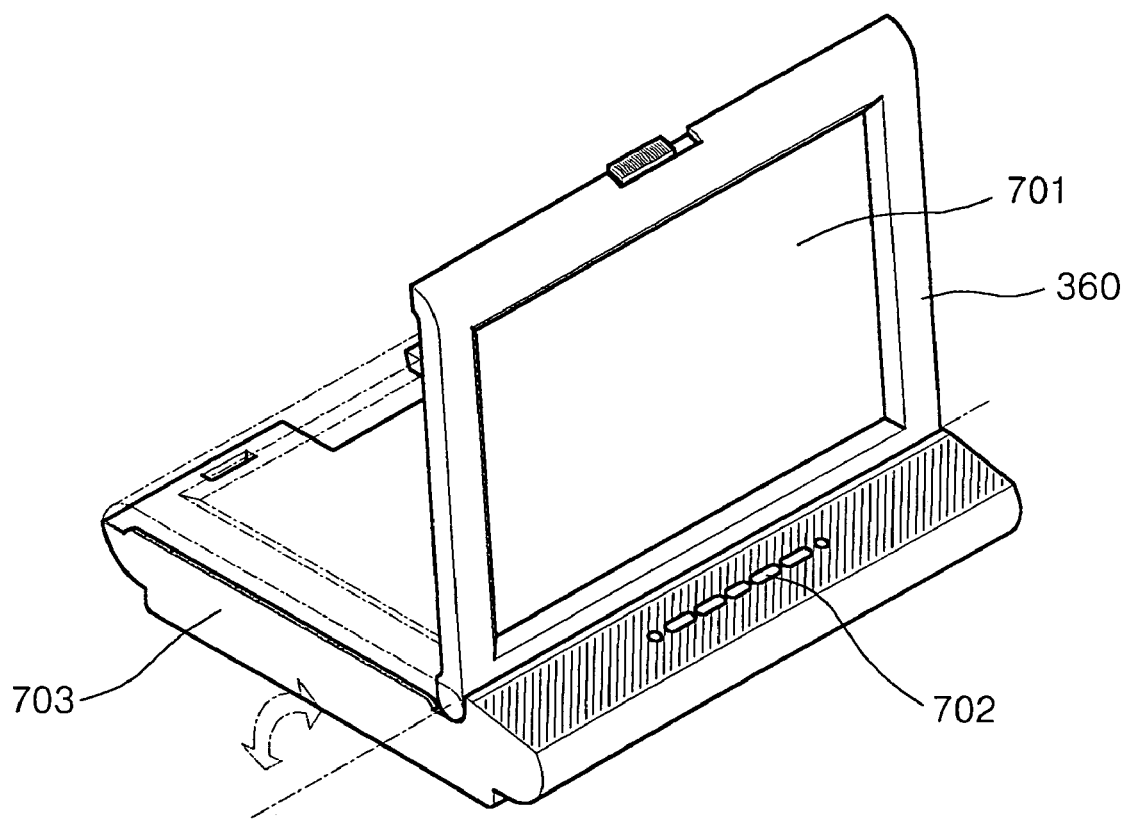
FIG. 11 is a perspective view of the display device capable of automatically controlling the image display direction of the present invention.

FIG. 11 is a perspective view of the display device capable of automatically controlling the image display direction of the present invention.

Referring to FIG. 11, the present invention basically consists of an image display unit 360 having an LCD panel 701 as a thin film installed on the upper inside to display image more beautifully, and a circuit installation unit 703 which is hinge-coupled with the image display unit 360 at its one side to support the rotation of the image display unit 360.

In addition, there is further installed a user input unit 310 having a plurality of buttons thereon on the front upper surface of the circuit installation unit 703 to control the image quality to be displayed on the LCD panel 701. In addition, the LCD panel 701 installed in the image display unit 360 is a thin film, but any types of an image display panel can be also employed only if it can display image. If necessary, various types of structure such as a PDP can be employed. In particular, a gyro-sensor 510 is installed inside the image display unit 360.

In particular, the LCD panel 701 to display image is installed on the upper side of the image display unit 360 not on its lower side to allow a user enjoy watching image with the image display unit 360 unfolded as well as it laid down.

Figure 12:
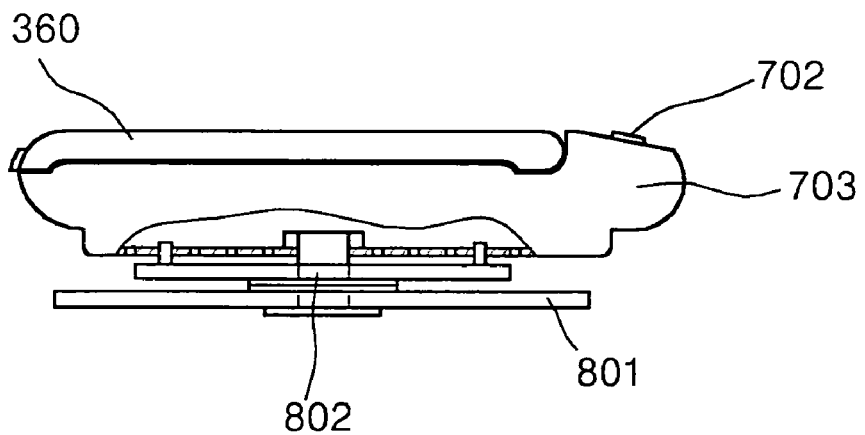
FIG. 12 is a sectional view of the display device capable of automatically controlling the image display direction of the present invention.

Referring to FIG. 12, a fixing unit 801 is installed on the lower side of the circuit installation unit 703 to enable the display device to be fixed to the ceiling inside a car or indoor. In addition, the fixing unit 801 and the circuit installation unit 703 have a portrait hinge 802 vertically inserted there into to portrait-rotate the circuit installation unit 703 against the fixing unit 801.

Referring to the structure described as above, the operation of the present invention will be illustrated. The image display unit 360 can be folded or spread against_the circuit installation unit 703 with a hinge at the center, and also, the spread angle of the display device is controllable to enable a user to adjust the angle of the display device which is convenient to see image. In particular, the display device can be installed on almost everywhere by means of the fixing unit 801 without further extra measures for installation, such as on a table, inside a car, on the ceiling of a room or the like.

In detail, in case that the display device is placed on a table, the direction which a user watches is a normal direction with the circuit installation unit 703 downside.

Figure 13:
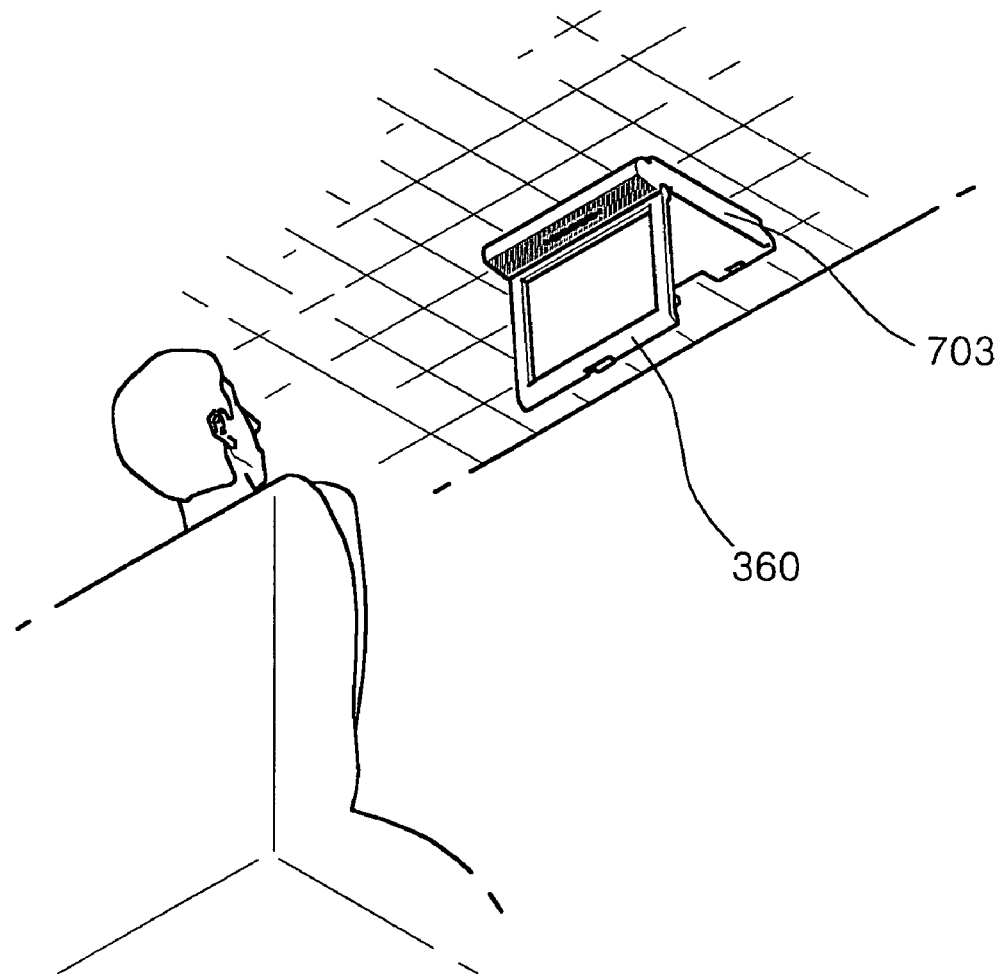
FIG. 13 illustrates one example of the states that the display device capable of automatically controlling the image display direction of the present invention is installed and operated.

However, the display device is placed on the ceiling (as shown in FIG. 13), a user watch image in the inverse-direction because the circuit installation unit 703 is placed on its upside. However, even in this case, the gyro-sensor 510 installed inside the image display unit 360 senses this inversion of the device to make the image displayed on the LCD panel 701 in the inverse direction.

Eventually, according to the present invention, when the image display unit 360 is tilted, the location of displayed image is automatically compensated so that the displayed image, itself, is set to fit into the vision of a user.

In particular, when the display device is installed on the ceiling inside a car or on the indoor ceiling, and the image display unit 360 is inversely placed, the image displayed on the image display unit 360 is not turned upside down to display in the normal direction to make a user see the image as usual. However, if a user wants to see the image displayed inversely, he or she can watch the inversely displayed image by presetting.

INDUSTRIAL APPLICABILITY

According to the present invention, even when the slope of the display device is changed, the image display direction is automatically readjusted according to the changed slope, the image displayed on the image display unit is seen in the normal direction without being turn upside down so that a user can more easily use the display device.

In addition, the display device of the present invention has advantage of broadening the usage applications while it becomes more and more minimized.

In particular, a user can enjoy watching the image on the display screen right after installing the display device inside a car or anywhere indoors without extra operation.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A display device capable of automatically controlling an image display direction comprising:
   an image display unit for displaying an image;
   a slope information processing unit for detecting a slope information of the image display unit;
   a control unit for receiving the slope information of the image display unit detected by the slope information processing unit, and producing an image control signal according to a tilted state of the image display unit;
   an image display control unit for receiving the image control signal produced by the control unit, and processing the image signal to be displayed on the image display unit; and
   an image display memory for storing the image signal processed in the image display control unit according to the image control signal, and supplying the stored image signal to the image display unit;
   wherein the slope information processing unit essentially comprises a location detection unit for detecting the slope information of the image display unit and a quantization processing unit for quantizing the slope information of the image display unit by the location signal detected by the location detection unit to be matched with a set period;
   wherein the location detection unit comprises at least one gyro-sensor; and
   wherein the quantization processing unit allots installation values with a predetermined gap according to the tilted state of the image display unit.

2. An operation method of a display device capable of automatically controlling an image display direction, the method comprising the steps of:
   a) acquiring a slope information of an image display unit;
   b) extracting an image display control data fit for the tilted state acquired by the image display unit;
   c) storing an image data in a memory according to be matched with the extracted image display control data; and
   d) outputting the image data stored in the memory on the image display unit;
   wherein the step (a) comprises the steps of: (a-1) detecting location information of the image display unit by a location detection sensor; (a-2) converting the detected location information of the image display unit to a digital signal; and (a-3) quantizing the slope information of the image display unit to be matched with a set period by referring to the location information of the image display unit converted to the digital signal;
   wherein the image display control data extracted in the (b) step comprises the information for a start point and an end point at which the image display is started and ended according to the tilted state of the image display unit, and a scan direction; and
   wherein the quantized slope information allots installation values with a predetermined gap according to the tilted state of the image display unit.

3. The operation method of claim 2, wherein the quantization interval in the (a-3) step of quantizing the slope information of the image display unit is essentially classified into a normal direction and an inverse direction according to the installation state of the image display unit in a vertical direction.

4. The operation method of claim 2, wherein in the (d) step of outputting the image data on the image display unit, the size of the image displayed on the image display unit is determined according to the small side of the horizontal/vertical side of the image display unit to display image.

5. A display device capable of automatically controlling the image display direction, comprising:
   an image display unit for displaying an image;
   at least one gyro-sensor for detecting a slope information of the image display unit;
   an analog digital conversion unit for converting an analog signal of the slope information outputted from the gyro-sensor to a digital signal;
   a quantization processing unit for quantizing the digital signal outputted from the digital conversion unit, and outputting the quantized digital signal as a control data allotting installation values with a predetermined gap according to the digital signal outputted from the digital conversion unit;
   a control unit for receiving the slope information of the image display unit detected by the quantization processing unit, and producing an image control signal according to the tilted state of the image display unit;

an image display control unit for receiving the image control signal produced by the control unit, and processing the image signal to be displayed on the image display unit; and an image display memory for storing the image signal processed in the image display control unit, and supplying the stored image signal to the image display unit;

wherein the control unit comprises: a microcomputer for processing an essential operation; an input/output control unit for processing a communication between the microcomputer and the image display control unit; and a control unit memory for storing an image display control data which is essentially required in the control unit according to a slope of the image display unit.

6. The display device of claim 5, wherein the gyro-sensor comprises a conduction detection switch.

7. The display device of claim 5, wherein the gyro-sensor comprises at least one metal shell switch.

* * * * *